J. E. BELL.
CULINARY VESSEL.
APPLICATION FILED SEPT. 25, 1912.
1,050,794.
Patented Jan. 21, 1913.
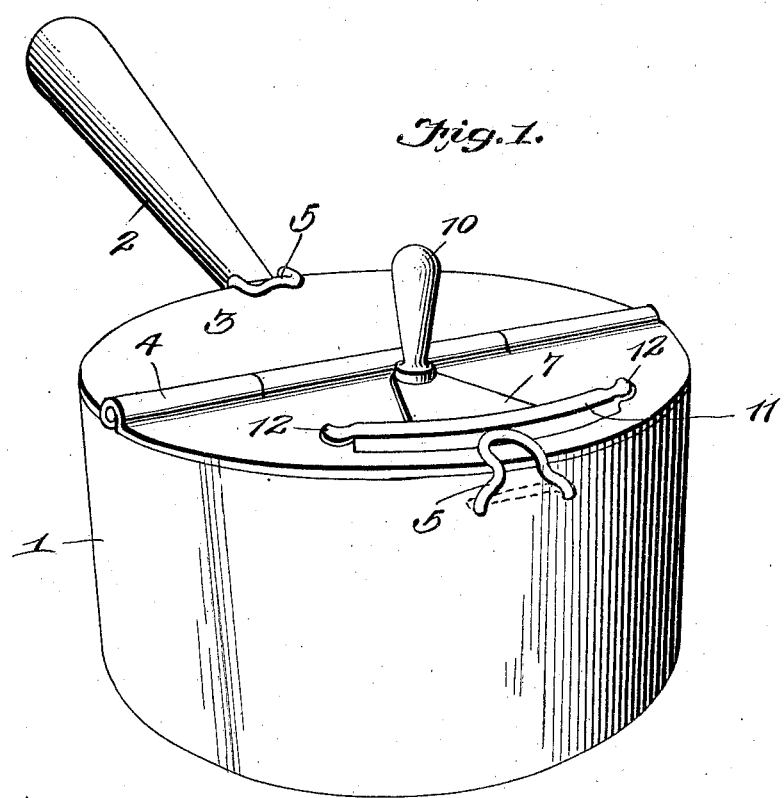
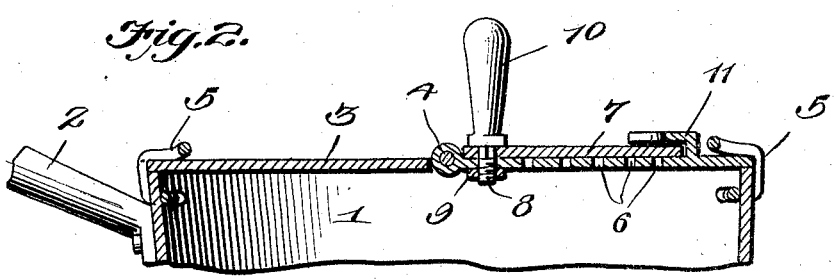
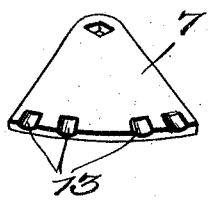
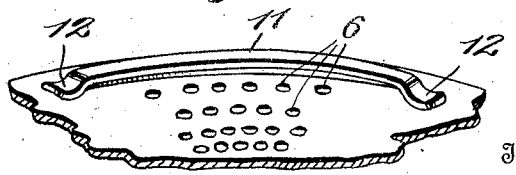
Witnesses
Chas. L. Griesbauer.
A. J. Hind.
Inventor
J. E. Bell,
By Watson E. Coleman,
Attorney

UNITED STATES PATENT OFFICE.

JENNIE E. BELL, OF RIDGEWOOD, NEW JERSEY.

CULINARY VESSEL.

1,050,794.  Specification of Letters Patent.  Patented Jan. 21, 1913.

Application filed September 25, 1912. Serial No. 722,309.

*To all whom it may concern:*

Be it known that I, JENNIE E. BELL, a citizen of the United States, residing at Ridgewood, in the county of Bergen and State of New Jersey, have invented certain new and useful Improvements in Culinary Vessels, of which the following is a specification, reference being had to the accompanying drawings.

This invention relates to new and useful improvements in cooking utensils and more particularly to a culinary vessel and my object is to provide a device of this character with an improved cover therefor.

A further object of the invention resides in providing a cover having drainage and steam discharge orifices therein and a still further object resides in providing a cover plate or valve for these orifices.

Still another object of the invention resides in providing an improved means for retaining the cover plate or valve in various adjusted positions on the cover, and a still further object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view of a vessel embodying my improvements. Fig. 2 is a fragmentary vertical section therethrough. Fig. 3 is a perspective view of the cover plate or valve removed; and Fig. 4 is a fragmentary perspective view of that section of the cover having the drainage or steam discharge orifices therein.

In describing my invention, I shall refer to the drawing in which similar reference characters designate corresponding parts throughout the several views and in which 1 indicates a receptacle of the usual or any preferred type, used for cooking purposes having the handle 2 secured thereto and resting on the upper edge of the receptacle is a cover 3, which is formed of sections hinged one to the other about centrally of the receptacle, as shown at 4. The receptacle is also provided at diametrically opposite points thereon with the spring locking clips 5 which are secured in the side walls of the receptacle and projected over the upper edge thereof to lock the sections of the cover 3 thereon. Thus the receptacle may be carried from place to place without danger of the cover falling therefrom, after the same has been once positioned on the receptacle.

The outer section of the cover 3 is provided with a plurality of orifices 6, which will permit the steam being discharged from the receptacle and at the same time will admit of the water within the receptacle being drained therefrom. I have provided a cover plate 7 for these openings which is substantially triangular in design to correspond to the arrangement of the openings in the cover and is removably carried on the squared portion of a pin or bolt 8 which extends through the outer section of said cover 3 adjacent the hinge 4. The free end of the pin or bolt 8 which is disposed on the inner face of the cover is engaged with a nut 9, while the head of the same has an upwardly extending handle 10 formed thereon. From this construction, it will be seen that the cover plate 7 may be readily turned through the medium of this handle 10 to form a closure for the openings 6 or to allow steam to be discharged therefrom, as the case may be. Also carried on the top face of the outer section of said cover 3, is an arcuate angular projection 11, under which the outer end of the cover plate or valve 7 extends. This angular projection or the like 11 forms a protection for the outer end of the cover plate 7 and the ends of this projection are provided with the downwardly curved spring locking flanges 12. The upper face of the cover plate 7 is also provided, at its outer edge with a plurality of notches 13 which are adapted to be engaged by these spring locking flanges 12, as said cover plate is drawn to one side or the other to allow certain of the openings to be uncovered. In this manner, the cover plate or valve 7 may be retained in various adjusted positions to allow a various number of openings to be uncovered as may be desired. It will, of course, be understood that when it is desired to cook certain articles in the shortest possible time, the cover plate 7 will be disposed to completely cover the openings 6 and when no hurry is required, the plate 7 may be adjusted to allow certain of the openings to be uncovered, whereby steam may be discharged therefrom.

While I have described the openings 6 as being for the purpose of permitting the discharge of steam, it will also be understood that the same are equally well adapted for use as drainage openings to permit water to be drained from the receptacle.

From the foregoing description of the construction of my improved device, the operation thereof will be readily understood and it will be seen that I have provided a simple, inexpensive and efficient means for carrying out the objects of the invention. While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

A cover for culinary vessels comprising a body having a plurality of openings therein, a cover plate for the openings pivotally carried on the upper face of said body, said cover plate being provided with notches in the upper face thereof, an angular arcuate projection also carried on the upper face of said body under which the outer end of said cover plate extends, and spring locking lugs carried at the ends of said projection and adapted to engage the notches in said cover plate to retain the latter in various adjusted positions on the body.

In testimony whereof I hereunto affix my signature in the presence of two witnesses.

JENNIE E. BELL.

Witnesses:
 CALVIN B. SMITH,
 RONALD B. HOPPER.

Copies of this patent may be obtained for five cents each, by addressing the "Commissioner of Patents, Washington, D. C."